(12) United States Patent
Etherton et al.

(10) Patent No.: US 6,201,076 B1
(45) Date of Patent: Mar. 13, 2001

(54) OLEFIN POLYMERIZATION PROCESS WITH FATTY AMINE ADDITIVES FOR IMPROVED ACTIVITY AND REDUCED FOULING

(75) Inventors: Bradley P. Etherton, Cincinnati; Gregory G. Hlatky, Morrow; James H. Meas, Jr., Cincinnati, all of OH (US)

(73) Assignee: Equistar Chemicals, L.P., Houston, TX (US)

( * ) Notice: Subject to any disclaimer, the term of this patent is extended or adjusted under 35 U.S.C. 154(b) by 0 days.

(21) Appl. No.: 09/301,802

(22) Filed: Apr. 29, 1999

(51) Int. Cl.$^7$ ................. C08F 4/64; C08F 2/44
(52) U.S. Cl. ............. 526/74; 526/124.9; 526/129; 526/130; 526/133; 526/134; 526/156; 526/160; 526/161; 526/217; 526/220
(58) Field of Search ............... 526/74, 217, 220, 526/124.9, 129, 130, 133, 134, 156, 160, 161

(56) References Cited

U.S. PATENT DOCUMENTS

| 4,182,810 | * | 1/1980 | Willcox | 526/64 |
|---|---|---|---|---|
| 4,752,597 | | 6/1988 | Turner | 502/104 |
| 4,791,180 | | 12/1988 | Turner | 526/160 |
| 4,792,592 | | 12/1988 | Fulks et al. | 526/62 |
| 4,855,370 | | 8/1989 | Chirillo et al. | 526/74 |
| 4,876,320 | | 10/1989 | Fulks et al. | 526/62 |
| 4,978,722 | | 12/1990 | Goko et al. | 525/255 |
| 5,026,795 | | 6/1991 | Hogan | 526/74 |
| 5,037,905 | | 8/1991 | Cummings et al. | 526/74 |
| 5,153,157 | | 10/1992 | Hlatky et al. | 502/117 |
| 5,198,401 | | 3/1993 | Turner et al. | 502/155 |
| 5,241,025 | | 8/1993 | Hlatky et al. | 526/129 |
| 5,539,124 | | 7/1996 | Etherton et al. | 548/402 |
| 5,554,775 | | 9/1996 | Krishnamurti et al. | 556/7 |
| 5,637,660 | | 6/1997 | Nagy et al. | 526/160 |
| 6,022,935 | * | 2/2000 | Fischer et al. | 526/901 X |

FOREIGN PATENT DOCUMENTS

| 0811638 A2 | 12/1997 | (EP) . |
|---|---|---|
| WO 96/11960 | 4/1996 | (WO) . |
| WO 96/11961 | 4/1996 | (WO) . |
| WO 96/34021 | 10/1996 | (WO) . |

OTHER PUBLICATIONS

Hawley's Condensed Chemical Dictionary, 11th ed., van Nostrand Reinhold, N.Y., 1992, 1118.*
Modern Plastics Encyclopedia, 42(1A), Sep. 1964, 398–400.*

* cited by examiner

*Primary Examiner*—Fred Teskin
(74) *Attorney, Agent, or Firm*—Kevin M. Carroll; Jonathan L. Schuchardt

(57) ABSTRACT

An olefin polymerization process is described. The process comprises polymerizing an olefin in the presence of a supported single-site catalyst, an optional activator, and a fatty amine. The fatty amine is added at a concentration in the range from about 10 to about 75 weight percent based on the weight of the supported catalyst. The fatty amine helps to reduce fouling and sheeting during the polymerization process and enhances catalyst activity.

21 Claims, No Drawings

OLEFIN POLYMERIZATION PROCESS WITH FATTY AMINE ADDITIVES FOR IMPROVED ACTIVITY AND REDUCED FOULING

FIELD OF THE INVENTION

This invention relates to a process for polymerizing olefins in the presence of a single-site catalyst, an optional activator, and a fatty amine additive. The fatty amine reduces reactor fouling and sheeting and simultaneously enhances the activity of the catalyst. Overall efficiency of the polymerization process is increased.

BACKGROUND OF THE INVENTION

Interest in metallocene and non-metallocene single-site catalysts (hereinafter all referred to as single-site catalysts) has continued to grow rapidly in the polyolefin industry. These catalysts are more reactive than conventional Ziegler-Natta catalysts, and they produce polymers with improved physical properties. The improved properties include narrow molecular weight distribution, reduced low molecular weight extractables, and good comonomer incorporation, which allows the production of low-density polymers.

Single-site catalysts are typically soluble in the polymerization reaction medium and are therefore advantageous in solution processes. However, for gas-phase, slurry, and bulk monomer processes, it is useful to immobilize the catalyst on an inert carrier or support. Unfortunately, supported catalysts tend to cause reactor fouling and/or sheeting. Reactor fouling results in many serious problems including poor heat transfer, poor particle morphology, and forced reactor shutdown.

To solve these problems, a number of process and catalyst modifications have been disclosed. For example, U.S. Pat. Nos. 4,792,592 and 4,876,320 disclose electrical methods to control reactor static electricity that leads to fouling and sheeting. EP 811,638 teaches addition of antistatic agents to control static buildup. Other additives have also been used to control reactor fouling. See for example U.S. Pat. Nos. 4,885,370, 4,978,722, 5,026,795, 5,037,905, and PCT Intl. Appl. Nos. WO 96/11960 and WO 96/11961.

In particular, WO 96/11960 and WO 96/11961 disclose catalyst systems formed by combining a metallocene, an activator, and a surface modifier applied to a support. Both references teach that the surface modifier must be added to the support during catalyst preparation. Addition of the surface modifier to the reactor during polymerization leads to fouling and a 65 percent loss in catalyst activity. See Example 6 of WO 96/11961. The preferred modifier amount is less than 3.5 percent of the catalyst weight, and the maximum allowable amount is 10 percent. Failure to observe these limits results in increased fouling and substantial reduction of catalyst activity. For instance, Example 6 of WO 96/11960 teaches a significant loss of activity at a modifier concentration of 5 percent.

EP 811,638 teaches addition of an amine antistatic agent to the polymerization reactor to reduce static buildup that can lead to fouling or sheeting. The antistatic agent is added to the reactor in an amount ranging from 1 to 200 ppm based on polymer produced, preferably from 1 to 100 ppm, and most preferably from 1 to 10 ppm (antistatic agent/polymer produced). Higher amounts lead to losses in catalyst activity. Comparative examples 10 and 11 teach that addition of 200 ppm of an ester or 2000 ppm of an ammonium antistatic agent decreases catalyst activity by 50–80%.

In sum, new ways to prevent reactor fouling in olefin polymerizations with single-site catalysts are needed. Particularly valuable processes would use readily available additives that can be fed directly to the reactor. This would prevent additional catalyst preparation expense. Ideally, the additives would increase or have a negligible effect on catalyst activity.

SUMMARY OF THE INVENTION

The invention is a polymerization process. The process comprises polymerizing an olefin in the presence of a supported single-site catalyst, an optional activator, and a fatty amine. The fatty amine is added directly to the polymerization reactor in an amount from about 10 to about 75 weight percent, based on the amount of supported catalyst.

We surprisingly found that the fatty amine, when added directly to the reactor in the prescribed amount, reduces or eliminates reactor fouling without hurting catalyst activity. In fact, the fatty amine actually helps to increase catalyst activity.

DETAILED DESCRIPTION OF THE INVENTION

The process of the invention comprises polymerizing an olefin in the presence of a supported single-site catalyst, optionally an activator, and from about 10 to about 75 weight percent, based on the amount of supported catalyst, of a fatty amine. The fatty amine is added directly to the reactor.

By "single-site catalyst," we mean all of the metallocene and non-metallocene catalysts now known. Single-site catalysts give polyolefins with characteristically narrow molecular weight distributions and high melt indices compared with polyolefins that are readily accessible with Ziegler-Natta catalysts. The single-site catalyst preferably has the formula:

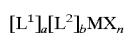

$$[L^1]_a[L^2]_b MX_n$$

where

M is a Group 3–10 transition metal;

$L^1$ and $L^2$ are the same or different polymerization-stable anionic ligands;

a+b=1 or 2;

each X is independently a neutral ligand or a uninegative sigma-bonded ligand; and a+b+n=the formal oxidation state of M.

The transition metal, M, may be any Group 3 to 10 metal or a metal from the lanthanide or actinide series. (The IUPAC system of numbering groups of elements of the Periodic Table is used throughout this application.) Preferably, the catalyst contains a Group 4 to 6 transition metal; more preferably, the catalyst contains a Group 4 metal such as titanium or zirconium.

Catalysts useful in the process of the invention preferably include polymerization-stable anionic ligands, $L^1$ and $L^2$. Suitable $L^1$ and $L^2$ ligands include cyclopentadienyl (substituted or unsubstituted) anions such as those described in U.S. Pat. Nos. 4,791,180 and 4,752,597, the teachings of which are incorporated herein by reference. Suitable $L^1$ and $L^2$ ligands also include substituted or unsubstituted boraaryl, pyrrolyl, indolyl, quinolinyl, hydroxypyridinyl, and aminopyridinyl groups as described in U.S. Pat. Nos. 5,554,775, 5,539,124, and 5,637,660, the teachings of which are also incorporated herein by reference. $L^1$ and $L^2$ can also be substituted or unsubstituted azaborolinyl ligands, such as those described in PCT Int. Appl. WO 96/34021. Preferably, the catalyst includes, at most, only one substituted or unsubstituted cyclopentadienyl ligand.

The polymerization-stable anionic ligands $L^1$ and $L^2$ can be bridged. Groups that can be used to bridge the polymerization-stable anionic ligands include, for example, methylene, ethylene, 1,2-phenylene, dialkylsilyls, and diarylsilyls. Normally, only a single bridge is used in the single-site catalyst, but complexes with two bridging groups are known and can be used. Bridging the ligand changes the geometry around the transition metal and can improve catalyst activity and other properties, such as molecular weight, comonomer incorporation, and thermal stability.

Each X is independently a neutral ligand or a uninegative sigma-bonded ligand. Preferred X ligands include hydride, halide, $C_1$–$C_{20}$ alkyl, aryl, alkoxy, aryloxy, siloxy, and dialkylamido. More preferably, X is hydride, chloride, bromide, $C_1$–$C_8$ alkoxy, $C_3$–$C_{18}$ trialkylsiloxy, or $C_2$–$C_6$ dialkylamido. Also particularly preferred are aryl and alkyl groups that do not undergo β-hydrogen elimination reactions (e.g., olefin formation with loss of M-H); examples are methyl, phenyl, benzyl, neopentyl, and the like.

Two X groups may be joined to form a metallacycle of 4 to 20 atoms, including the metal. Examples include metallacycloalkanes, metallasilacycloalkanes, and metallacyclopentadiene complexes. Butadienyl ligands, which can have a formal $\sigma^2,\eta^2$ structure, are also included.

Suitable neutral ligands include, for example, π-bonded ligands such as $\eta^2$-ethylene, $\eta^2$-bis(trimethylsilyl)acetylene, $\eta^4$-butadiene, $\eta^2$-benzyne, and the like. Neutral X ligands also include solvating molecules coordinated to the metal such as tetrahydrofuran, diethyl ether, triethylamine, and the like.

The single-site catalyst is immobilized on a support, which is preferably a porous material. The support can be inorganic oxides, inorganic chlorides, and polymeric resins such as polystryrene, styrene-divinylbenzene copolymers, or the like, or mixtures thereof. Preferred supports are inorganic oxides, which include oxides of Group 2, 3, 4, 5, 13, or 14 elements. More preferred supports include silica, alumina, silica-alumina, magnesia, titania, and zirconia.

Preferably, the support has a surface area in the range of about 10 to about 700 m²/g, more preferably from about 50 to about 500 m²/g, and most preferably from about 100 to about 400 m²/g. Preferably, the pore volume of the support is in the range of about 0.1 to about 4.0 mL/g, more preferably from about 0.5 to about 3.5 mL/g, and most preferably from about 0.8 to about 3.0 mL/g. Preferably, the average particle size of the support is in the range of about 10 to about 500 μm, more preferably from about 20 to about 200 μm, and most preferably from about 10 to about 100 μm. The average support pore diameter is typically in the range of about 10 to about 1000 Å, preferably about 20 to about 500 Å, and most preferably about 50 to about 350 Å.

The single-site catalysts are supported using any of a variety of well-known immobilization techniques. In one method, the single-site catalyst is dissolved in a solvent, and the solution is added to the dry support. The single-site catalyst is then deposited onto the support by evaporating the solvent. An incipient wetness method can also be used. The activator can also be deposited on the support or it can be introduced into the reactor separately from catalyst.

An activator is preferably used to convert the metal complex to a cationically active species. Suitable activators include alumoxanes. Preferred alumoxanes are polymeric aluminum compounds represented by the cyclic formula $R^1$—Al—O$)_s$ or the linear formula $R^1(R^1$—Al—O$)_s$AlR$^1$ wherein $R^1$ is a $C_1$–$C_5$ alkyl group and s is an integer from 1 to about 20. Preferably, $R^1$ is methyl and s is from about 4 to about 10. Exemplary alumoxane activators are (poly) methylalumoxane (MAO), ethylalumoxane, and diisobutylalumoxane. Optionally, the activator is a trialkyl or triaryl aluminum compound, which preferably has the formula $AlR^2_3$ where $R^2$ denotes a $C_1$–$C_{20}$ hydrocarbyl.

Suitable activators also include substituted or unsubstituted trialkyl or triaryl boron or aluminum derivatives, such as tris(pentafluorophenyl)boron and tris(pentafluorophenyl) aluminum, and ionic borates and aluminates such as tri(n-butyl)ammonium tetrakis(pentafluorophenyl)borate, trityl tetrakis(pentafluorophenyl)borate or trityl tetrakis (pentafluorophenyl)aluminate. The ionic borates and aluminates ionize the neutral organometallic compound to produce an active catalyst for olefin polymerization. See, for instance, U.S. Pat. Nos. 5,153,157, 5,198,401, and 5,241,025, all of which are incorporated herein by reference.

The molar ratio of the metal of the activator component to the transition metal of the single-site catalyst is preferably in the range of about 0.3:1 to 1000:1, more preferably from about 20:1 to 800:1, and most preferably from about 50:1 to 500:1. Where the activator is an ionic borate, the molar ratio of the metal of the activator component to the transition metal of the single-site catalyst is preferably in the range of about 0.3:1 to 3:1.

A fatty amine is used in the process of the invention. By "fatty amine," we mean an amine that contains one or more long-chain hydrocarbyl groups, which can be further substituted with other functional groups such as ether or hydroxyl groups. Preferred fatty amines have the formula $R^3R^4R^5N$ in which at least one of $R^3$, $R^4$, or $R^5$ is a $C_8$ or greater hydrocarbyl, and is preferably a $C_8$–$C_{30}$ hydrocarbyl. Suitable fatty amines include primary, secondary, tertiary, and ethoxylated or propoxylated amines. Examples include oleylamine, 1-dodecylamine, di-n-octadecylamine, tri (isodecyl)amine, dimethyl-n-decylamine, bis(2-hydroxyethyl)dodecylamine, and bis(2-hydroxypropyl) dodecylamine. A particularly preferred fatty amine is Armostat® 310, product of Akzo Nobel Chemicals, Inc., which is a bis(2-hydroxyethyl)tallowamine.

The fatty amine is used in an amount within the range of about 10 to about 75 weight percent, preferably from about 35 to about 75 weight percent, and most preferably about 50 to about 75 weight percent, based on the amount of the supported single-site catalyst. When less than 10 wt. % of the fatty amine is used, there is too little improvement in reducing fouling or increasing catalyst activity. More than 75 wt. % is uneconomical and can deactivate the supported single-site catalyst.

The supported single-site catalyst and activator are added to the polymerization reactor separately from the fatty amine. Preferably, the single-site catalyst and activator are combined first to form a solution of their reaction product, which is then combined with the support material, evaporated, washed, and dried.

The supported catalyst can also be produced by contacting an organometallic compound, such as trimethylaluminum, with silica containing water, absorbed and adsorbed, to form an activator (alumoxane, for example). The single-site catalyst is then added to the support and activator.

The process of the invention is used to polymerize olefins, preferably α-olefins. Suitable olefins include, for example, ethylene, propylene, 1-butene, 1-hexene, 1-octene, and the like, and mixtures thereof. The catalyst is valuable for copolymerizing ethylene with α-olefins or di-olefins (e.g., 1,3-butadiene, 1,4-hexadiene, 1,5-hexadiene).

Processes of the invention include gas phase, slurry, and bulk monomer processes. Gas and slurry phase processes are preferred.

In the slurry process, particulate polymer is formed in a liquid reaction medium to which a-olefins and often hydrogen are added, along with catalyst. The fatty amine is fed to the reactor separately from the catalyst. A slurry process involves pressures in the range of about 1 to about 500 atmospheres and temperatures in the range of about −60° C. to about 100° C. The reaction medium employed should be liquid under the conditions of polymerization and relatively inert. Preferably, it is an alkane, a cycloalkane, or an aromatic hydrocarbon such as toluene, ethylbenzene, or xylene. More preferably, hexane or isobutane is employed.

The addition of a fatty amine prevents reactor fouling during olefin polymerization (see Example 1 and Comparative Example A below). Surprisingly, fatty amine addition also results in higher catalyst activity (see Table 2 below). Catalyst activity (measured in terms of kilograms of polymer produced per gram of transition metal per hour) with the fatty amine is up to 120 percent higher compared to tests without fatty amine addition.

The following examples merely illustrate the invention. Those skilled in the art will recognize many variations that are within the spirit of the invention and scope of the claims.

EXAMPLE 1

A supported metallocene catalyst is produced from Davison 948 silica dehydrated at 275° C. under flowing nitrogen. Bis(indenyl) zirconium dichloride (25.7 g) is dissolved in a PMAO solution (1911 mL, 7.5 wt. % polymethylalumoxane in toluene), stirred for 5 minutes, and is then added to 468 grams of silica. The Al:Zr molar ratio is 70:1. The resulting slurry is stirred for thirty minutes, dried at 50° C. under flowing nitrogen, washed with hexane (400 mL), filtered, and then dried at 50° C. under vacuum. The catalyst contains 0.70 wt. % Zr.

The catalyst is used to polymerize ethylene. The catalyst is fed to a 100-gallon stirred-tank reactor containing 80 gallons of a polyethylene/hexane slurry. The flow rates of each component are shown in Table 1. The reactor temperature is maintained at 80° C. and the reactor pressure is 70 psig. Armostat® 310 fatty amine (product of Akzo Nobel Chemicals Inc.) is added separately as a 0.17 wt. % solution in hexane. The solution is free of air and water. The mass flow rate of Armostat 310 is about 71% of the catalyst mass flow rate. The amount of Armostat 310 added is 584 ppm of the amine/polymer produced.

Polyethylene is produced continuously at the specified rates until about 1200 lbs. of resin is produced in about 60 hours. The polymer produced has a melt index of 0.8 dg/min and density of 0.950 g/mL.

There is no accumulation of polymer in the pilot plant system and no plugging or fouling in the reactor or other pieces of equipment.

COMPARATIVE EXAMPLE A

The catalyst described in Example 1 is used in the same reactor under the same conditions except that Armostat® 310 is not added. In this case, the pilot plant only operates for about 4 to 12 hours before being shut down. During this period of time, polymer particles agglomerate and grow in the hexane suspension until they reach sufficient size to plug the discharge piping of the reactor. In addition, the agglomerates accumulate on the cooling coils and reduce heat transfer from the reactor. On opening the reactor, we observe large aggregates of polymer loosely attached to the walls, piping, and cooling coils inside the reactor.

EXAMPLES 2–6 and COMPARATIVE EXAMPLES B–E

These examples show the effect on catalyst activity of fatty amine added directly to a slurry polymerization reactor. Additional catalysts are prepared by the method described in Example 1. These catalysts are then tested in laboratory polymerization reactors. The data is shown in Table 2. The designation "SSM-2" simply means the second batch of silica-supported metallocene catalyst.

Slurry polymerization is conducted in a stirred 1.7-liter, stainless-steel reactor. Dry, oxygen-free hexane (850 mL) is charged to the dry, oxygen-free reactor at room temperature. All polymerizations are conducted using triethylaluminum (TEAL, 0.25 mmoles) as a scavenger. The specified quantity of TEAL is charged to the reactor followed by the specified quantity of fatty amine. No hydrogen or comonomer is added. The reactor is heated to 80° C. and allowed to equilibrate. Ethylene is then introduced to give a total pressure of 150 psig, and the reactor is allowed to equilibrate again. Supported catalyst (28.6 mg, containing 2.5 micromoles of Zr) suspended in hexane is injected into the reactor to start the polymerization. Ethylene is fed to the reactor to maintain a constant pressure. At the end of one hour, ethylene flow is stopped and the reaction mixture is cooled to room temperature. The polymer is collected by vacuum filtration, dried overnight in a vacuum oven, and weighed.

The examples show that introducing a fatty amine to the reaction mixture significantly increases catalyst activity (here, up to 120%). This activity increase is unexpected based on the teachings in WO 96/11960 and EP 811,638.

EXAMPLE 7 and COMPARATIVE EXAMPLE F

These examples show the effect of a fatty amine on a single-site catalyst containing a boratabenzene ring and a borate activator.

A silica-supported catalyst is prepared on Davison 948 silica dehydrated at 275° C. under flowing nitrogen. TEAL (25 wt. % in heptane, 283 mL) is added at room temperature to dehydrated silica (540 g) suspended in hexane (1.99 L). The mixture is stirred for 30 minutes, then dried under flowing nitrogen. A toluene (2.27 L) solution containing cyclopentadienyl(1-methylborabenzene) zirconium dichloride (14.1 g) and trityl tetra(perfluorophenyl)borate (73.4 g) is prepared at 50° C., added to the stirring silica over 10 minutes, then stirred for 30 minutes. The slurry is dried to a free-flowing powder under flowing nitrogen at 70° C. The recovered catalyst (688 g) contains 0.56 wt. % Zr.

The catalyst (BB-1) is used to polymerize ethylene under conditions similar to those described in Examples 2-6, except the polymerization temperature is 650C. The amount of TEAL is 0.25 mmole as described earlier. The catalyst (81 mg, containing 5.0 micromoles of Zr) is suspended in hexane and is injected into the reactor to start the polymerization. No fatty amine is added in Comparative Example F. Fatty amine is added in Example 7.

The results (Table 2) show a 22% increase in catalyst activity.

TABLE 1

Reactor Flow Rates from Example 1

| Component | Feed Rate |
|---|---|
| Ethylene | 20 lbs./hr |
| Hexane | 250 gal/hr |
| Hydrogen | 0.1–0.2 grams/hr |
| Catalyst | 7.5 grams/hr |
| Triethylaluminum | 0.50 grams/hr |
| Armostat ® 310 | 5.3 grams/hr |

TABLE 2

Polymerization Results: Effect of Fatty Amine Additive

| Example | Catalyst No. | Fatty Amine | Amine/Cat Wt. Ratio | Polymer Wt. (g) | Catalyst Activity (kg/g Zr/hr) |
|---|---|---|---|---|---|
| 2 | SSM-2 | Armostat ® 310 | 0.35 | 30.0 | 132 |
| B | SSM-2 | None | 0 | 21.8 | 96 |
| C | SSM-2 | Armostat ® 310 | 0.03 | 19.1 | 84 |
| 3 | SSM-3 | Armostat ® 310 | 0.35 | 28.7 | 126 |
| 4 | SSM-3 | Armostat ® 310 | 0.17 | 22.8 | 100 |
| 5 | SSM-3 | Armostat ® 310 | 0.52 | 43.0 | 189 |
| 6 | SSM-3 | Armostat ® 310 | 0.70 | 45.0 | 197 |
| D | SSM-3 | None | 0 | 20.1 | 88 |
| E | SSM-3 | Armostat ® 310 | 1.05 | 17.4 | 76 |
| 7 | BB-1 | Armostat ® 310 | 0.49 | 45.1 | 99 |
| F | BB-1 | None | 0 | 36.9 | 81 |

We claim:

1. A process which comprises polymerizing an olefin in a polymerization reactor in the presence of a supported single-site catalyst, an optional activator, and from about 10 to about 75 weight %, based on the amount of supported catalyst, of a fatty amine, wherein the fatty amine is added directly to the polymerization reactor.

2. The process of claim 1 wherein the supported single-site catalyst has the formula:

$$[L^1]_a[L^2]_b MX_n$$

wherein
  M is a Group 3–10 transition metal;
  $L^1$ and $L^2$ are the same or different polymerization-stable anionic ligands;
  a+b=1 or 2;
  each X is independently a neutral ligand or a uninegative sigma-bonded ligand; and
  a+b+n=the formal oxidation state of M.

3. The process of claim 2 wherein M is a Group 4–6 transition metal.

4. The process of claim 2 wherein M is a Group 4 transition metal.

5. The process of claim 2 wherein the polymerization-stable ligand is selected from the group consisting of substituted or unsubstituted cyclopentadienyl, boraaryl, hydroxypyridinyl, aminopyridinyl, quinolinyl, azaborolinyl, pyrrolyl, indolyl, and mixtures thereof.

6. The process of claim 2 wherein the catalyst includes, at most, one substituted or unsubstituted cyclopentadienyl ligand.

7. The process of claim 2 wherein X is selected from the group consisting of hydride, chloride, bromide, $C_1$–$C_8$ alkoxy, $C_3$–$C_{18}$ trialkylsiloxy, methyl, phenyl, benzyl, neopentyl, and $C_2$–$C_6$ dialkylamido.

8. The process of claim 1 wherein the support is selected from the group consisting of silicas, aluminas, silica-aluminas, titanias, zirconias, and magnesias.

9. The process of claim 1 wherein the activator is selected from the group consisting of alumoxanes, ionic borates, and ionic aluminates.

10. The process of claim 1 wherein the fatty amine contains at least one $C_8$ or greater hydrocarbyl.

11. The process of claim 10 wherein the fatty amine contains at least one $C_8$ to $C_{30}$ hydrocarbyl.

12. The process of claim 1 wherein the fatty amine is used in an amount from about 35 to about 75 weight %, based on the amount of supported catalyst.

13. The process of claim 1 wherein the olefin is ethylene or a mixture of ethylene and an α-olefin.

14. The process of claim 1 wherein the measured catalyst activity increases by at least about 10% compared with the measured activity in the absence of the fatty amine.

15. A process which comprises polymerizing an olefin in a polymerization reactor in the presence of:
  (a) a supported single-site catalyst of the formula:

$$[L^1]_a[L^2]_b MX_n$$

wherein
  M is a Group 4–6 transition metal;
  $L^1$ and $L^2$ are the same or different polymerization-stable anionic ligands selected from the group consisting of substituted or unsubstituted cyclopentadienyl, boraaryl, hydroxypyridinyl, aminopyridinyl, quinolinyl, azaborolinyl, pyrrolyl, indolyl, and mixtures thereof;
  a+b=1 or 2;
  X is selected from the group consisting of hydride, chloride, bromide, $C_1$–$C_8$ alkoxy, $C_3$–$C_{18}$ trialkylsiloxy, methyl, phenyl, benzyl, neopentyl, and $C_2$–$C_6$ dialkylamido; and
  a+b+n=the formal oxidation state of M;
  (b) an optional activator selected from the group consisting of alumoxanes, ionic borates, and ionic aluminates; and
  (c) from about 10 to about 75 weight %, based on the amount of supported catalyst, of a fatty amine containing at least one $C_8$ or greater hydrocarbyl, wherein the fatty amine is added directly to the polymerization reactor.

16. The process of claim 15 wherein M is a Group 4 transition metal.

17. The process of claim 15 wherein the catalyst includes, at most, one substituted or unsubstituted cyclopentadienyl ligand.

18. The process of claim 15 wherein the olefin is ethylene or a mixture of ethylene and an α-olefin.

19. The process of claim 15 wherein the fatty amine contains at least one $C_8$ to $C_{30}$ hydrocarbyl.

20. The process of claim 15 wherein the fatty amine is used in an amount from about 35 to about 75 weight %, based on the amount of supported catalyst.

21. A process which comprises polymerizing ethylene or a mixture of ethylene and an α-olefin in a polymerization reactor in the presence of:
  (a) a silica-supported single-site catalyst of the formula:

$$[L^1]_a[L^2]_b MX_n$$

wherein
  M is a Group 4 transition metal;
  $L^1$ and $L^2$ are the same or different polymerization-stable anionic ligands selected from the group consisting of substituted or unsubstituted cyclopentadienyl, boraaryl, hydroxypyridinyl, aminopyridinyl, quinolinyl, azaborolinyl, pyrrolyl, indolyl, and mixtures thereof;
  a+b=1 or 2;
  X is selected from the group consisting of hydride, chloride, bromide, $C_1$–$C_8$ alkoxy, $C_3$–$C_{18}$ trialkylsiloxy, methyl, phenyl, benzyl, neopentyl, and $C_2$–$C_6$ dialkylamido; and
  a+b+n=the formal oxidation state of M;
  (b) an activator selected from the group consisting of alumoxanes, ionic borates, and ionic aluminates; and
  (c) from about 35 to about 75 weight %, based on the amount of supported catalyst, of a fatty amine containing at least one $C_8$ to $C_{30}$ hydrocarbyl, wherein the fatty amine is added directly to the polymerization reactor.

\* \* \* \* \*